United States Patent [19]
Eyrainer

[11] Patent Number: 5,868,421
[45] Date of Patent: Feb. 9, 1999

[54] GAS BAG LATERAL IMPACT PROTECTIVE DEVICE

[75] Inventor: Heinz Eyrainer, Waldstetten, Germany

[73] Assignee: TRW Occupant Restraint Systems GmbH, Alfdorf, Germany

[21] Appl. No.: 978,678

[22] Filed: Nov. 26, 1997

Related U.S. Application Data

[63] Continuation of Ser. No. 734,594, Oct. 22, 1996, abandoned.

[30] Foreign Application Priority Data

Nov. 2, 1995 [DE] Germany ............... 295 17 373.4

[51] Int. Cl.⁶ .................................................. B60R 21/22
[52] U.S. Cl. .................... 280/730.2; 280/743.1; 280/743.2
[58] Field of Search ............... 280/728.1, 730.1, 280/730.2, 743.1, 743.2

[56] References Cited

U.S. PATENT DOCUMENTS

| | | | |
|---|---|---|---|
| 5,094,475 | 3/1992 | Olsson et al. | 280/730.2 |
| 5,224,732 | 7/1993 | Warner et al. | |
| 5,340,151 | 8/1994 | Sato | 280/730.2 |
| 5,378,019 | 1/1995 | Smith et al. | 280/743.1 |
| 5,533,752 | 7/1996 | Brown et al. | 280/730.2 |

FOREIGN PATENT DOCUMENTS

| | | | |
|---|---|---|---|
| 646202 | 2/1994 | Australia | 280/730.2 |
| 2030863 | 6/1970 | Germany | 280/743.1 |
| 29605897 | 9/1996 | Germany. | |
| 5032149 | 2/1993 | Japan. | |
| 5-139238 | 6/1993 | Japan | 280/730.2 |
| 5139229 | 6/1993 | Japan. | |
| 5139232 | 6/1993 | Japan. | |
| 6-1198 | 1/1994 | Japan | 280/730.2 |
| 7125603 | 5/1995 | Japan. | |
| 2293355 | 3/1996 | United Kingdom. | |

*Primary Examiner*—Eric D. Culbreth
*Attorney, Agent, or Firm*—Tarolli, Sundheim, Covell, Tummino & Szabo

[57] ABSTRACT

A gas bag lateral impact protective device for vehicle occupants is provided. The gas bag lateral impact protective device is integrated in a vehicle door and includes a compressed gas source and a head protecting gas bag which is to be inflated by the compressed gas source and which deploys on inflation in a space to the side of the vehicle door. The head protecting gas bag is connected with the vehicle door by a peripheral portion of an inflation opening and in addition by an attachment part which, with respect to a longitudinal direction of the vehicle, is spaced from the inflation opening.

7 Claims, 3 Drawing Sheets

GAS BAG LATERAL IMPACT PROTECTIVE DEVICE

This application is a continuation of application Ser. No. 08/734,594 filed on Oct. 22, 1996, abandoned.

TECHNICAL FIELD

The invention relates to a gas bag lateral impact protective device for vehicle occupants.

BACKGROUND OF THE INVENTION

Such a protective device serves to prevent, in the case of a lateral impact, contact between the vehicle occupant and parts of the vehicle such as the B column or the inner side of the door or with movable or stationary objects like other vehicles or posts, intruding into the vehicle. One problem with such protective devices is that the head protecting gas bag must be exactly and reliably positioned so that even if the impact of the vehicle occupant's head is not exactly central there will be no displacement of the head out of a position ensuring proper protection. A further problem is in connection with the safety belt which normally extends from the B column to the upper body of the vehicle occupant and which may obstruct deployment of the head protecting gas bag.

BRIEF SUMMARY OF THE INVENTION

The invention provides a gas bag lateral impact protective device for vehicle occupants. The gas bag lateral impact protective device is integrated in a vehicle door and comprises a compressed gas source and a head protecting gas bag which is to be inflated by the compressed gas source and which is adapted to deploy on inflation in a space to the side of the vehicle door. The head protecting gas bag is connected with the vehicle door by a peripheral portion of an inflation opening and in addition by an attachment part which, with respect to a longitudinal direction of the vehicle, is spaced from the inflation opening. Owing to this design on the one hand there is a particularly satisfactory stabilization of the head protecting gas bag in the inflated state thereof, while on the other hand with such a configuration a deployment operation is possible in which there is no obstruction by the safety belt.

Further advantageous developments of the invention are defined in the dependent claims.

BRIEF DESCRIPTION OF THE DRAWINGS

The invention will now be described in the following with reference to the accompanying drawings.

DETAILED DESCRIPTION OF THE INVENTION

Figure 1:
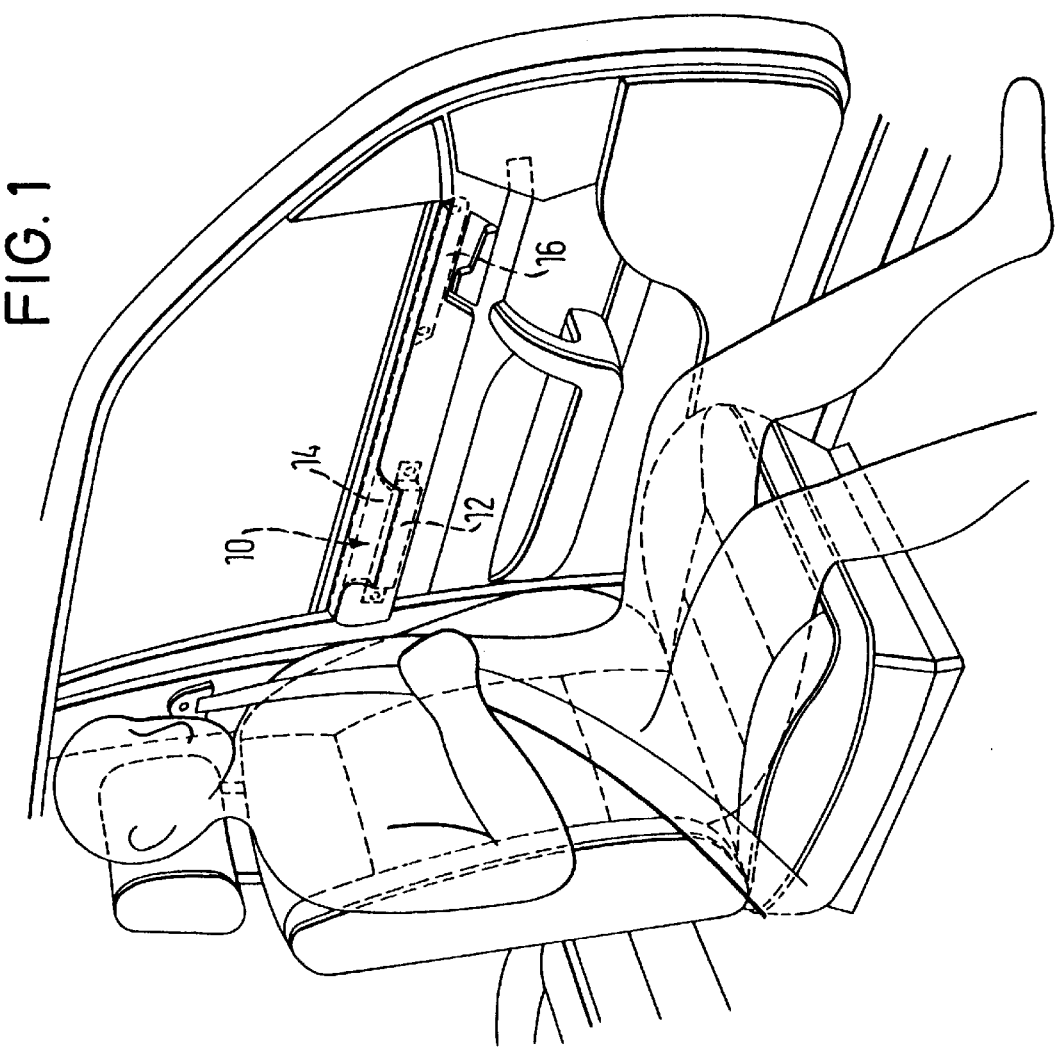
FIG. 1 shows a diagrammatic representation of one embodiment of a protective device in accordance with the invention in the inactive position thereof.
Figure 3:
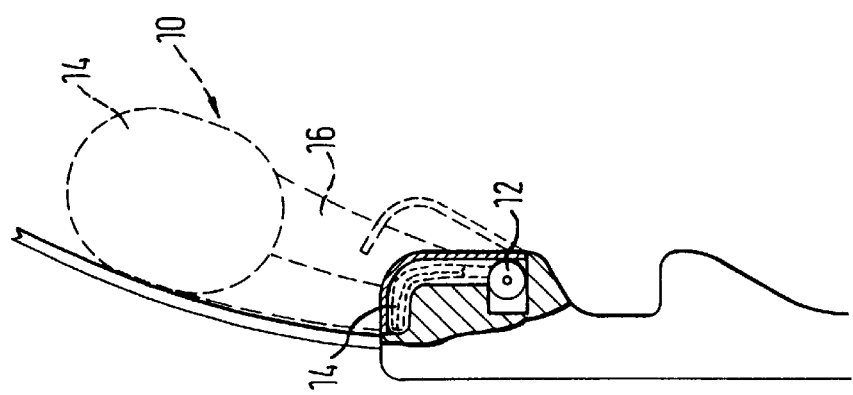
FIG. 3 is a cross section taken through the protective device in accordance with the invention, wherein the head protecting gas bag is depicted both in the inactive and also in the deployed condition.

In FIG. 1 the reader will diagrammatically see a gas bag lateral impact protective device 10 which is integrated in a vehicle door. The protective device comprises as its principal part a diagrammatically indicated compressed gas source 12 and a head protecting gas bag 14. The compressed gas source 12 is connected with a diagrammatically represented vehicle door and possesses an outlet opening (not illustrated). The head protecting gas bag 14 has an inflation opening (not illustrated), whose peripheral section is connected with the outlet opening of the compressed gas source 12. In the inactive position illustrated in this figure the head protecting gas bag 14 is folded up in a generally elongated form so that it is arranged above the compressed gas source 12 along the upper edge of the cladding of the vehicle door, but behind same (see also FIG. 3). At the axial end, which is to the front as related to the vehicle door, of the folded head protecting gas bag 14 an attachment portion 16 is provided, which is designed in the form of a fabric flap integral with the head protecting gas bag 14 and which is sewn off. This fabric flap 16 is permanently connected with the door in the front part of the lower window frame.

Figure 2:
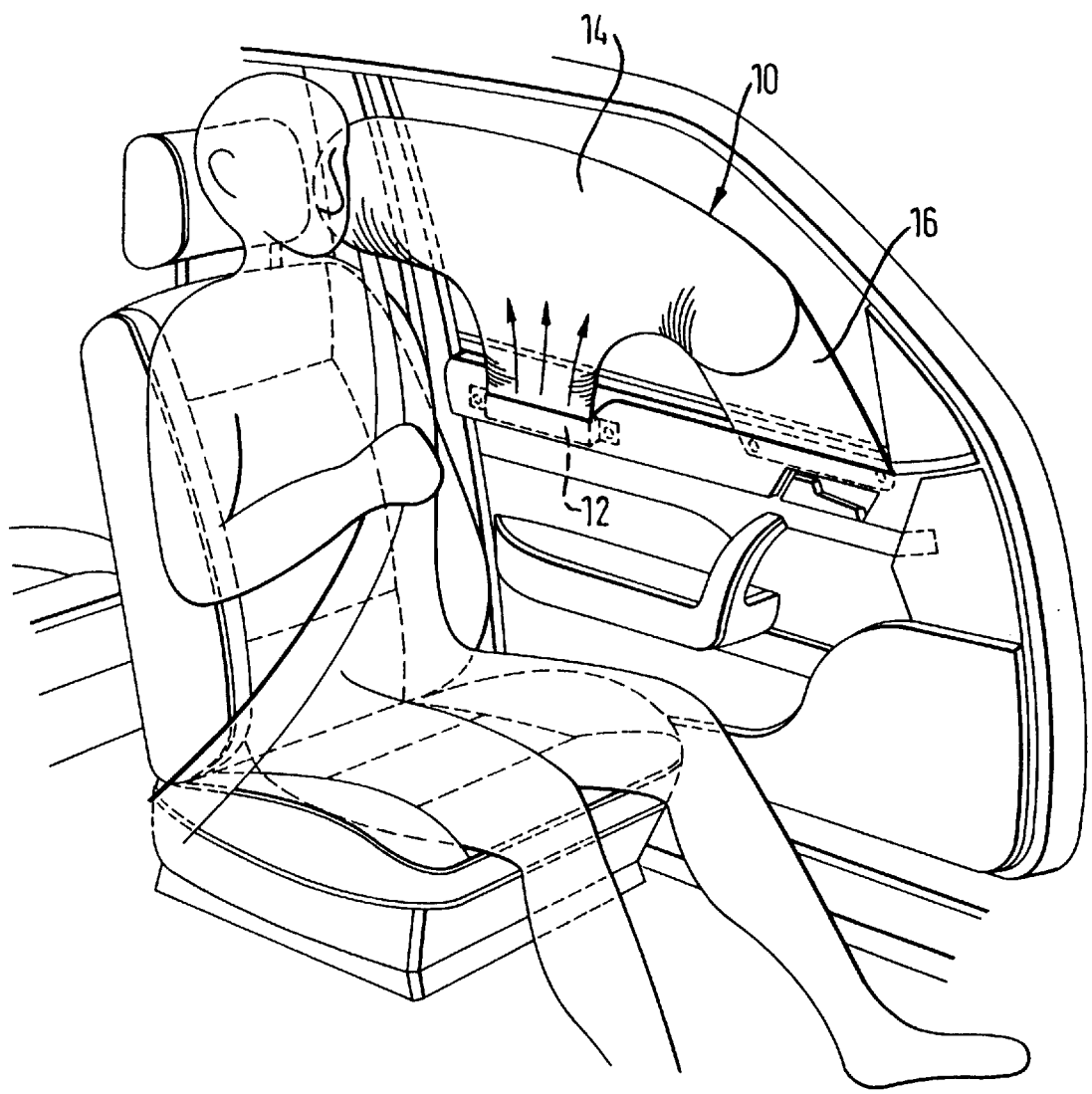
FIG. 2 is a diagrammatic showing of the protective device of FIG. 1 with the head protecting gas bag deployed.

For activation the compressed gas source 12 is fired by a sensor triggering device (not illustrated), following which a certain quantity of gas under pressure is produced, which flows into the head protecting gas bag 14. Same will begin to deploy, the cladding of the vehicle door being so released that the head protecting gas bag 14 may emerge from the cladding (see FIGS. 2 and 3). For the attachment of the cladding to the vehicle door it is possible to provide a readily releasing connection such as a clip fastener. In FIG. 2 the reader will see that in its fully inflated condition, the head protecting gas bag 14 possesses a generally cylindrical form and is connected with the vehicle door on the one hand by way of the peripheral section of the inflation opening and the compressed gas source 12 and on the other hand via the fabric flap 16. The fabric flap 16 is located at one axial end of the head protecting gas bag 14, whereas the other axial end of the head protecting gas bag is located beyond the rear edge of the vehicle door adjacent to the B column.

Figure 4:
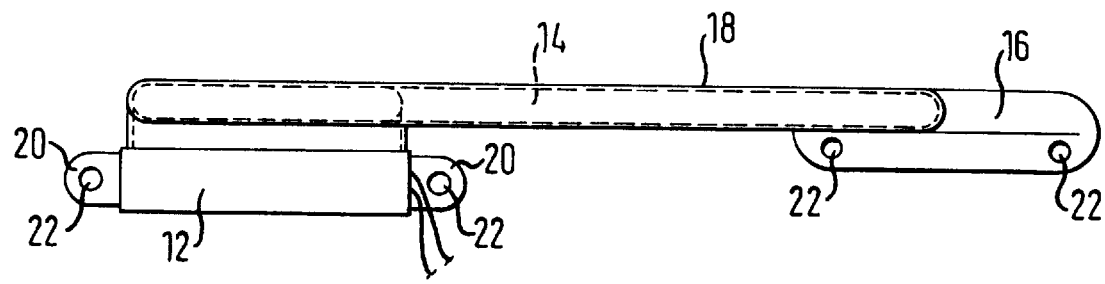
FIG. 4 shows the subassembly constituted by the head protecting gas bag and the compressed gas source.

FIG. 4 diagrammatically shows the subassembly constituted by the compressed gas source 12 and the head protecting gas bag 14. The folded up gas bag is sealed in a piece of thermofoil so that it maintains its shape during shipping and assembly. In this figure the attachment lugs 20 of the compressed gas source 12 and attachment holes 22 of the fabric flap 16 will be seen, with which the subassembly may be joined to the vehicle door or, respectively, with its cladding. The subassembly illustrated here may be pre-assembled in the cladding of the vehicle door, before the cladding is installed in the vehicle door.

Figure 5:
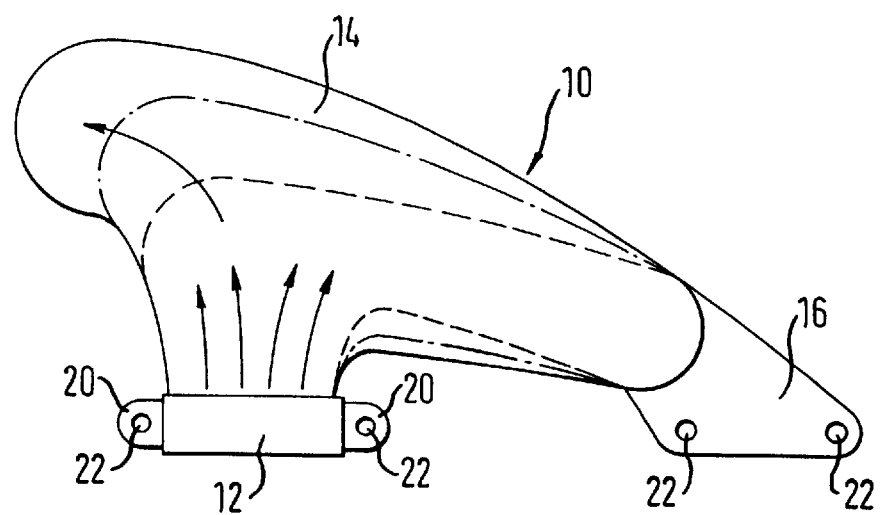
FIG. 5 shows the deployment of the head protecting gas bag.

In FIG. 5 the deployment of the head protecting gas bag 14 is to be seen. By adopting a suitable system of folding of the gas bag it is possible to ensure that the axial end, opposite to the fabric flap 16, of the head protecting gas bag only deploys toward the end of the process of deployment of the gas bag to the rear and toward the B column. This prevents the safety belt extending between the B column and the upper body of a vehicle occupant from hindering the deployment of the head protecting gas bag 14. In order to guarantee such a mode of deployment the respective end of the gas bag may be tucked inward when it is folded up. A similar effect may be obtained by having rip-open seams (not illustrated) which on deployment burst open in a controlled fashion and accordingly ensure the desired deployment mode.

Owing to the above described design of the protective device in accordance with the invention the following advantages are produced: due to the use of an attachment portion 16 separate from the head protecting gas bag 14 deployment of the gas bag is ensured which is not obstructed by a safety belt extending between the B column and the upper body of a vehicle occupant. Furthermore owing to the additional connection with the vehicle door, that is to say by means of the fabric flap 16, the head protecting gas bag 14 is particularly stable in the deployed state so that even if the vehicle occupant's head should impinge on the head protecting gas bag eccentrically there will be no undesired displacement in position of the head protecting gas bag 14. Owing to the arrangement of the folded up head protecting gas bag 14 along the upper edge of the vehicle door cladding and owing to the emergence of the gas bag in the process of deployment through a gap between the upper edge of the cladding and the door itself a predetermined point or line of weakness in the door cladding is unnecessary through which a gas bag stowed in the vehicle door would normally emerge. Owing to the generally elongated form of the gas bag and owing to the attachment portion 14, controlled regular detachment of the cladding from the door is ensured together with a regular, controlled emergence of the head protecting gas bag 14 from the behind the cladding. Since the compressed gas source 12 is arranged underneath the window of the vehicle door, there is generally a lower noise level for the vehicle occupant to put up with on firing of the compressed gas source than is the case with protective devices in which the gas generators are accommodated in the roof portion, for example, or in the head rest of the vehicle seat. Owing to the sewn-off fabric flap 16 and the generally cylindrical configuration of the head protecting gas bag 14 same possesses a comparatively small volume, something yielding a favorable effect as regards the necessary size of the compressed gas source 12 and furthermore the required inflation time. Finally as looked at from the aspect of impingement of the deploying head protecting gas bag on the body of the vehicle occupant, in the case of the head protecting gas bag in accordance with the invention deploying in a downward direction there is a substantially better effect than is the case with head protecting gas bags, which for example deploy starting from the head support of the vehicle.

According to a further embodiment, not shown, of the gas bag lateral impact protective device, it is provided that the inflation opening and the attachment part are arranged inverted with respect to the embodiment shown in the drawing. Accordingly, the inflation opening of the gas bag 14 is arranged, as related to the direction of travel of the vehicle, in front of the fabric flap 16.

I claim:

1. A gas bag lateral impact protective device for vehicle occupants, which is integrated in a vehicle door and comprises a compressed gas source and a head protecting gas bag having an inflation opening, which is inflatable from a folded state into a deployed state by said compressed gas source and which, in said deployed state, extends in a space aside said vehicle door, said head protecting gas bag having two separate attachment sections for connection with said vehicle door, one of said attachment sections being formed by a peripheral portion of said inflation opening and the other attachment section being formed by an attachment part which, with respect to a longitudinal direction of said vehicle door, is spaced from said inflation opening, said attachment part being located at an axial end of said head protecting gas bag.

2. The gas bag lateral impact protective device according to claim 1, wherein said vehicle door has a forward end and a rearward end, said inflation opening being arranged closer to said rearward end than said attachment part.

3. The gas bag lateral impact protective device according to claim 1, wherein said head protecting gas bag possesses an elongated configuration in said deployed state.

4. The gas bag lateral impact protective device as claimed in claim 1 wherein said head protecting gas bag, in said folded state, possesses an elongated form and is arranged along an upper edge of a cladding of said vehicle door.

5. A gas bag lateral impact protective device for vehicle occupants, which is integrated in a vehicle door and comprises a compressed gas source and a head protecting gas bag having an inflation opening, which is inflatable from a folded state into a deployed state by said compressed gas source and which, in said deployed state, extends in a space aside said vehicle door, said head protecting gas bag having two separate attachment sections for connection with said vehicle door, one of said attachment sections being formed by a peripheral portion of said inflation opening and the other attachment section being formed by an attachment part which, with respect to a longitudinal direction of said vehicle door, is spaced from said inflation opening, said attachment part being a flap of fabric.

6. The gas bag lateral impact protective device according to claim 5, wherein said fabric flap is integral with said head protecting gas bag.

7. A gas bag lateral impact protective device for vehicle occupants, which is integrated in a vehicle door and comprises a compressed gas source and a head protecting gas bag having an inflation opening, which is inflatable from a folded state into a deployed state by said compressed gas source and which, in said deployed state, extends in a space aside said vehicle door, said head protecting gas bag having two separate attachment sections for connection with said vehicle door, and one of said attachment sections being formed by a peripheral portion of said inflation opening and the other attachment section being formed by an attachment part which, with respect to a longitudinal direction of said vehicle door, is spaced from said inflation opening, said vehicle door having a forward end and a rearward end, said inflation opening being arranged closer to said rearward end than said attachment part, said attachment part being arranged at an axial end of said head protecting gas bag and an opposite axial end being located beyond a rear edge of said vehicle door.

* * * * *